United States Patent
Lei et al.

(10) Patent No.: US 11,960,043 B2
(45) Date of Patent: Apr. 16, 2024

(54) DATA DRIVEN METHOD TO INVERT FOR THE FORMATION ANISOTROPIC CONSTANTS USING BOREHOLE SONIC DATA

(71) Applicant: Schlumberger Technology Corporation, Sugar Land, TX (US)

(72) Inventors: Ting Lei, Arlington, MA (US); Romain Prioul, Concord, MA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 17/754,395

(22) PCT Filed: Oct. 2, 2020

(86) PCT No.: PCT/US2020/053975
§ 371 (c)(1),
(2) Date: Mar. 31, 2022

(87) PCT Pub. No.: WO2021/067725
PCT Pub. Date: Apr. 8, 2021

(65) Prior Publication Data
US 2022/0373707 A1  Nov. 24, 2022

Related U.S. Application Data

(60) Provisional application No. 62/909,429, filed on Oct. 2, 2019.

(51) Int. Cl.
*G01V 1/50*  (2006.01)

(52) U.S. Cl.
CPC .......... *G01V 1/50* (2013.01); *G01V 2210/614* (2013.01); *G01V 2210/6222* (2013.01); *G01V 2210/626* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,698,793 | A * | 10/1987 | Wu | G01V 1/48 702/6 |
| 7,660,195 | B2 * | 2/2010 | Mandal | G01V 1/48 181/102 |
| 10,353,094 | B2 * | 7/2019 | Sinha | G01V 1/50 |
| 2006/0120217 | A1 | 6/2006 | Wu et al. | |
| 2015/0049585 | A1 | 2/2015 | Collins et al. | |
| 2017/0115413 | A1 | 4/2017 | Wang et al. | |

(Continued)

FOREIGN PATENT DOCUMENTS

WO   2018125058 A1   7/2018
WO   2018231234 A1   12/2018

OTHER PUBLICATIONS

Christopher V. Kimball, Thomas L. Marzetta, Semblance processing of borehole acoustic array data, Geophysics, 49, 3, 274-281, 1984.

(Continued)

*Primary Examiner* — Elias Desta

(57) ABSTRACT

A method is presented wherein inversion for formation anisotropic constants is achieved using borehole sonic data.

14 Claims, 14 Drawing Sheets

(56) References Cited

U.S. PATENT DOCUMENTS

2018/0164463 A1    6/2018  Hornby et al.

OTHER PUBLICATIONS

Thomsen, L. (1996). Weak elastic anisotropy, Geophysics, 51, 1954-1966.
Wang, Z, (2002). Seismic anisotropy in sedimentary rocks, part 2: Laboratory data, Geophysics, 67,1423-1440.
Sinha, B. K., A. N. Norris, and S. K. Chang, 1994, Borehole flexural modes in anisotropic formations: Geophysics, 59, 1037-1052.
Sinha, B. K., Şimşek, E., and Liu, Q. H. (2006). Elastic-wave propagation in deviated wells in anisotropic formations. Geophysics, 71(6), D191-D202.
Ekstrom, M.E., "Dispersion Estimation from Borehole Acoustic Arrays Using a Modified Matrix Pencil Algorithm," 29th Asilomar Conf. Signals Systems and Computing, Pacific Grove, CA, Oct. 31, 1995.
International Search Report and Written Opinion issued in PCT Application PCT/US2020/053975, dated Jan. 27, 2021 (10 pages).
International Preliminary Report on Patentability issued in PCT Application PCT/US2020/053975, dated Apr. 14, 2022 (7 pages).
Extended Search Report in European Patent Application No. 20872125.8 dated Sep. 19, 2023, 7 pages.

\* cited by examiner

Gulf32, DTs115.52, Eps0.145, Gamma0.071, Delta-0.068 ial application claims priority.

DATA DRIVEN METHOD TO INVERT FOR THE FORMATION ANISOTROPIC CONSTANTS USING BOREHOLE SONIC DATA

CROSS-REFERENCE TO RELATED APPLICATIONS

The present application claims priority to U.S. Provisional Patent Application 62/909,429, filed Oct. 2, 2019 the entirety of which is incorporated by reference.

FIELD OF THE DISCLOSURE

Aspects of the disclosure relate to manipulation of sonic data. More specifically, aspects of the disclosure relate to methods for inversion of formation anisotropic constants using sonic data.

BACKGROUND INFORMATION

Traditionally, sonic waveform processing workflow mainly consists of the evaluation of formation compressional (dtc) and shear (dts) slownesses, or P&S. These two logs can be extracted by waveforms from a monopole or a dipole transmitter or a quadrupole transmitter using Schlumberger Technology Corporation equipment. Most sedimentary rock, however, exhibits a certain degree of anisotropy. This is particularly true for geological deposits that incorporate shale. This anisotropy effect plays an important role in geomechanical studies. The most commonly observed anisotropy type in shale is called vertical transverse isotropy (VTI), where five parameters are required to describe elastic constants. Using the notational language commonly used in this field, this type of anisotropy can be described by two vertical slowness (i.e., dtc and dts, or alternatively by two velocities, i.e., $V_P0$ and $V_S0$) and three dimensionless (so called "Thomsen") parameters $\epsilon$, $\gamma$, and $\delta$, that reduce to zeros for an isotropic formation. These three parameters are required to build the mechanical earth model (MEM) for geomechanical analysis, such as estimation of rock stiffness, strength, stresses, sanding prediction, wellbore stability and hydraulic fracturing design.

The three Thomsen parameters described above cannot directly be measured by a borehole sonic logging tool along a single orientation at a given depth. Model-based inversion methods are used to estimate these anisotropy constants. Such model-based inversion methods are not robust and may yield unreliable results because of the existence of several local minimum in the cost function, which is defined by the mismatch between the measured borehole modes and the theoretical borehole modes. Additionally, mud properties in the downhole environment are also required to be known so that the model-based inversion can be calculated. These mud properties, however, are often not measured. In some cases, these mud property values may have a large influence on the borehole dispersion modes.

There is a need, therefore, to accurately estimate anisotropic parameters, including the three Thomsen parameters.

There is a further need to accurately estimate anisotropic parameters as a function of depth.

There is a further need to use a physically-constrained data-driven approach for accurately estimating these anisotropic parameters.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one non-limiting embodiment, a method is disclosed. The method may comprise obtaining a waveform and processing the obtained waveform to obtain at least one of a Stoneley, flexural, quadrupole and Pseudo-Rayleigh dispersion. The method may also comprise at least one of performing a computation and obtaining a library computation for interpolated theoretical dispersions of the Stoneley, flexural, quadrupole and Pseudo-Rayleigh dispersions. The method may also comprise performing an initial estimate of mud slowness using both the processing of the obtained waveform and the interpolating the theoretical dispersions and calculating a mismatch between the processed waveform obtaining the at least one Stoneley, flexural, quadrupole and Pseudo-Rayleigh dispersion and the theoretical dispersions of the Stoneley, flexural, quadrupole and Pseudo-Rayleigh dispersions. The method may further comprise estimating at least one DTmud value as a vertical depth profile and calculating a second mismatch between the theoretical dispersion and the processed waveform using the at least one estimated DTmud value. The method may also comprise estimating at least one parameter by minimizing the second mismatch and using regression, calculating the at least one parameter over multiple depths. The method may also comprise updating values for the at least one parameter based upon the regression and calculating a third mismatch between the theoretical and measured dispersions based upon the updated values for the at least one parameter based upon the regression. The method may also comprise estimating a final value of the at least one parameter by minimizing a mismatch between the theoretical and measured dispersions.

In another example embodiment, a method may be performed. The method may comprise obtaining a waveform from a sonic borehole device in a formation. The method may also comprise processing the obtained waveform from the sonic borehole device to obtain at least one value of a Stoneley, flexural, quadrupole and Pseudo-Rayleigh dispersion. The method may also further comprise performing a computation to produce a theoretical dispersions of the Stoneley, flexural, quadrupole and Pseudo-Rayleigh dispersions for the waveform. The method may further comprise performing an initial estimate of mud slowness using both the processing of the obtained waveform and the theoretical dispersion. The method may also comprise calculating a first mismatch between the processed waveform obtaining the at least one Stoneley, flexural, quadrupole and Pseudo-Rayleigh dispersion and the theoretical dispersions of the Stoneley, flexural, quadrupole and Pseudo-Rayleigh dispersions. The method may also comprise estimating at least one DTmud value as a vertical depth profile and calculating a second mismatch between the theoretical dispersion and the processed waveform using the at least one estimated DTmud value. The method may also provide for estimating at least one Thomson parameter for the formation by minimizing the second mismatch and using regression, calculating at least one revised Thomson parameter over multiple depths. The method may also comprise calculating a third mismatch between the theoretical and measured dispersions based upon the updated values for Thomson parameter based upon the regression. The method may further comprise estimating a final value of the at least one Thomson parameter by minimizing a mismatch between the theoretical and measured dispersions.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

In FIG. 13B the stacked mud slowness over depth is depicted and in FIG. 13C a second step inversion is illustrated using the stacked mud slowness of 196 us/ft, where from left to right: mismatch map for different values for $\gamma$ (track 1); mismatch map for different values of $\epsilon$ (track 2); mismatch map for different values of $\delta$ (track 3). Note that the dashed lines represent the uncertainties, which are computed by mismatch value less than 1 us/ft. With mud slowness stacked at 196 us/ft, estimation of the Thomsen parameters in step 2 now has much less uncertainties compared to step 1.

In FIG. 14A, an initial correlation range is between $\epsilon$ and $\gamma$. In FIG. 14B, a $2^{nd}$ pass inversion result is illustrated using 5 synthetic core data and assuming a constant mud slowness profile. From left to right, mismatch map for different values for $\gamma$ (track 1); mismatch map for different values of $\epsilon$ (track 2); mismatch map for different values of $\delta$ (track 3). In FIG. 14C, a new correlation range between $\epsilon$ and $\gamma$ after $2^{nd}$ pass inversion is illustrated. In FIG. 14D, a $3^{rd}$ pass inversion result is illustrated where new correlation range is used. Note that the dashed lines represent the uncertainties, which are computed by mismatch value less than 1 us/ft. With $\gamma$ and $\epsilon$ correlation range reduced, estimation of the Thomsen parameters in step 3 now has much less uncertainties compared to step 2.

Figure 1:
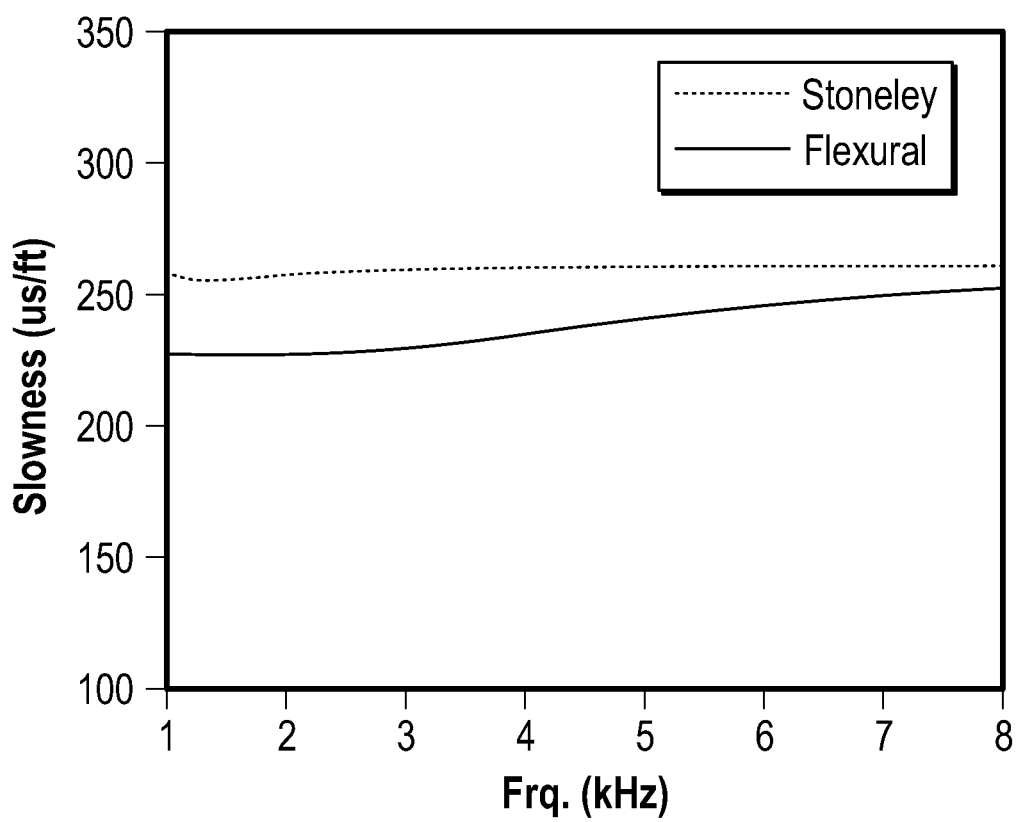
FIG. 1 is a graph of synthetic monopole Stoneley and dipole flexural dispersion curves for a North Sea shale A1 core.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Aspects described apply to the field of borehole sonic waveform processing. Application of methods described can provide quantification on magnitudes and uncertainties of anisotropic elastic constants (e.g., the three Thomsen parameters in a vertical transversely isotropic (VTI) formation) along with borehole mud slownesses as a function of depth. The methods described can be used with a sonic logging tool equipped with a single mode transmitter or multiple mode transmitters. Embodiments presented are applicable to both wireline and logging-while-drilling tools. The obtained anisotropic elastic constants can then be used in petrophysical and geomechanical applications.

The objective of aspects of the disclosure is to deliver the estimation of the anisotropic parameters (e.g., the three Thomsen parameters) along with borehole mud slownesses as a function of depth, using a physically-constrained data-driven approach. The whole workflow/method may include three steps. First, a comprehensive random or grid searching algorithm is performed to match all possible theoretical borehole dispersion curves to the measured borehole modes of a sonic logging tool. The search range is constrained based on certain initial physical or empirical correlations. The first step can give rough estimates of the mud slowness as either linear profile, multi-linear profile, or non-linear profile over depth. Then in the second step, the same dispersion match process is repeated using the linear, multi-linear or non-linear profiles of mud slowness obtained from the $1^{st}$ step. The second step may give estimation of anisotropic parameters (e.g., Thomsen parameters). Because anisotropic parameters are often observed to follow certain strong correlations for a given formation, a linear regression or non-linear regression method can be applied to obtain a local correlation model using the inversion results in the 2nd step. Finally, as a third step, the search process is repeated to match the measured borehole mode dispersions, whereas the newly constrained correlations are applied in defining the search range of anisotropic parameters and thereby can get a more reliable estimate of the anisotropic parameters.

Note that the above workflow/method is one of the possible examples; in the applications, we may apply more than or less than 3 steps in the inversion workflow. The sequences of steps may be altered. Note also in the first step, the regressed dtm profile might be associated with certain uncertainties, which can be brought into the second step as well.

Sensitivities of Borehole Dispersion Modes to Mud Slowness and Anisotropic Elastic Constants Several modeling examples are provided to illustrate the sensitivities of borehole modes to formation and mud properties and explain how to estimate the Thomsen parameters and mud slowness based on these observations.

Consider a wireline open hole sonic logging tool in either a fast formation or a slow formation with different parameters, as listed in Table 1, where $c_{11}$, $c_{33}$, $c_{44}$, $c_{13}$, $c_{66}$ are the five independent VTI elastic constants, $\rho$ the bulk density, $\epsilon$, $\gamma$, $\delta$ the anisotropic Thomsen parameters.

TABLE 1

Laboratory measured linear elastic constants of rock samples from [3] [4] and [5]

| Rock samples | $\rho$ g/cm$^3$ | $c_{11}$ GPa | $c_{33}$ GPa | $c_{44}$ GPa | $c_{13}$ GPa | $c_{66}$ GPa | $\epsilon$ | $\gamma$ | $\delta$ |
|---|---|---|---|---|---|---|---|---|---|
| Africa shale D1 | 2.41 | 30.62 | 24.64 | 6.19 | 13.37 | 7.89 | 0.121 | 0.138 | 0.046 |
| Africa shale E1 | 2.51 | 39.90 | 24.41 | 5.89 | 11.25 | 11.93 | 0.317 | 0.513 | −0.054 |
| Africa shale E3 | 2.50 | 38.87 | 26.80 | 6.85 | 17.00 | 12.55 | 0.225 | 0.416 | 0.160 |
| Africa shale E4 | 2.57 | 49.22 | 35.95 | 10.80 | 13.25 | 15.96 | 0.185 | 0.239 | −0.030 |
| Africa shale E5 | 2.54 | 43.50 | 26.33 | 6.54 | 18.57 | 13.76 | 0.326 | 0.553 | 0.229 |
| Austin Chalk | 2.2 | 22.0 | 14.0 | 2.4 | 12.0 | 3.1 | 0.286 | 0.146 | 0.224 |
| Bakken Shale | 2.23 | 40.9 | 26.9 | 10.5 | 8.5 | 15.3 | 0.26 | 0.23 | 0.104 |

TABLE 1-continued

Laboratory measured linear elastic constants of rock samples from [3] [4] and [5]

| Rock samples | ρ g/cm³ | $c_{11}$ GPa | $c_{33}$ GPa | $c_{44}$ GPa | $c_{13}$ GPa | $c_{66}$ GPa | ε | γ | δ |
|---|---|---|---|---|---|---|---|---|---|
| Cotton Valley | 2.6 | 74.7 | 58.8 | 22.0 | 25.3 | 30.0 | 0.135 | 0.180 | 0.205 |
| North Sea shale A1 | 2.32 | 16.91 | 12.17 | 4.17 | 3.66 | 5.43 | 0.195 | 0.152 | −0.014 |
| North Sea shale A2 | 2.35 | 20.82 | 13.59 | 4.93 | 4.01 | 6.75 | 0.266 | 0.185 | 0.021 |
| North Sea shale G1 | 2.44 | 27.94 | 23.14 | 4.43 | 16.49 | 5.78 | 0.104 | 0.152 | 0.101 |
| Gulf Coast shale C1 | 2.44 | 26.33 | 18.33 | 4.64 | 12.22 | 5.77 | 0.218 | 0.122 | 0.192 |
| Hard shale G3 | 2.6 | 54.42 | 36.18 | 14.73 | 7.94 | 20.23 | 0.252 | 0.187 | 0.035 |
| Hard shale G5 | 2.6 | 52.52 | 39.01 | 17.48 | 5.04 | 19.22 | 0.173 | 0.050 | 0.026 |
| Hard shale G28 | 2.6 | 54.93 | 36.51 | 16.36 | 7.97 | 20.82 | 0.252 | 0.136 | 0.126 |
| Hard shale G30 | 2.56 | 52.59 | 32.98 | 12.97 | 10.55 | 17.70 | 0.297 | 0.182 | 0.116 |
| Hard shale G32 | 2.597 | 58.37 | 45.23 | 18.08 | 5.81 | 20.63 | 0.145 | 0.071 | −0.068 |
| Siliceous shale B1 | 1.84 | 15.19 | 13.54 | 4.04 | 5.71 | 4.40 | 0.061 | 0.045 | 0.019 |
| Siliceous shale B2 | 1.95 | 18.24 | 17.46 | 5.22 | 3.56 | 5.34 | 0.022 | 0.012 | −0.17 |

Among all these core samples, two representative samples are selected (North Sea shale A1 and Hard shale G32) to study their dispersion sensitivities to mud slowness and VTI parameters.

Figure 2A:
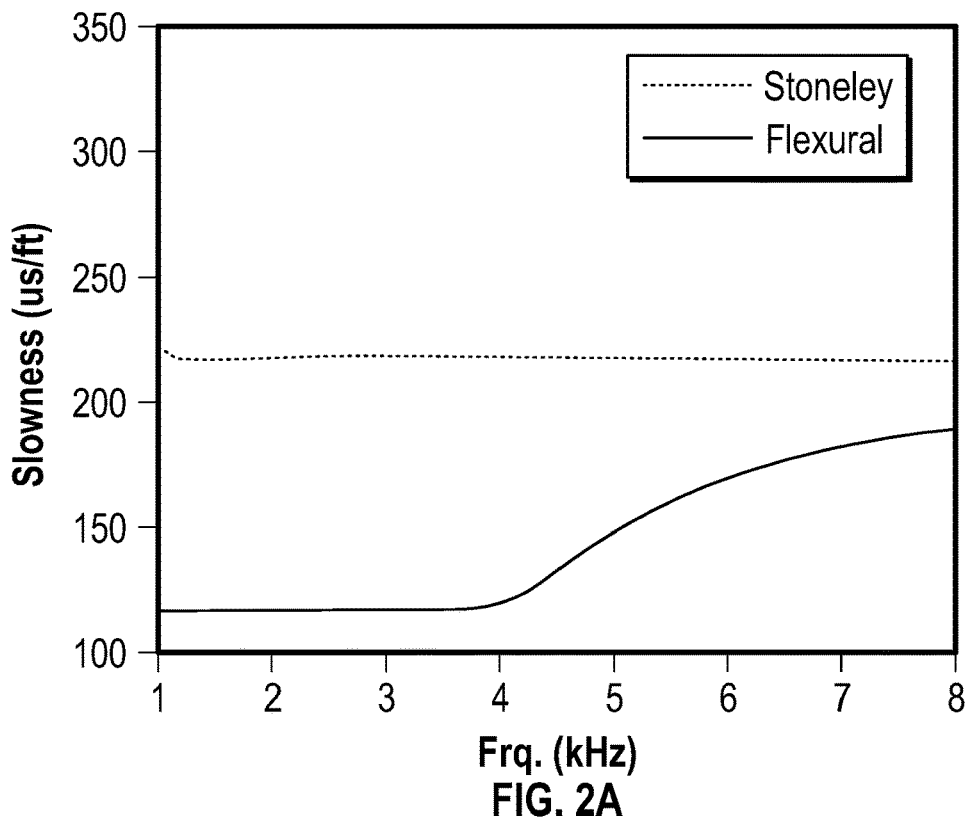
FIG. 2A is a synthetic monopole Stoneley and dipole flexural dispersion curve for a hard shale G32 core.
Figure 2B:
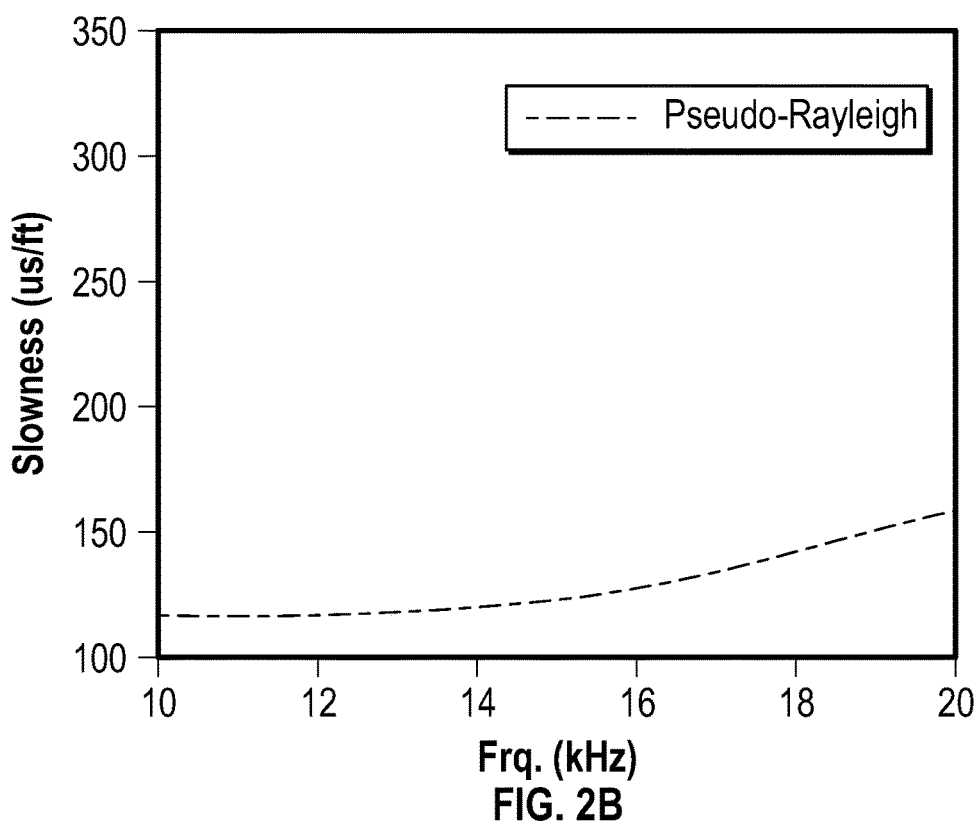
FIG. 2B is a Pseudo-Rayleigh dispersion curve for the hard shale G32 core of FIG. 2A.

FIG. 1 illustrates the synthetic dispersions of Stoneley and flexural modes using formation rock properties of a North Sea shale A1 core data in Table 1. In the synthetic modeling, the borehole diameter is 7 inches. The mud slowness is 200 μs/ft. Mud density is 1000 kg/m³. FIG. 2A illustrates the synthetic monopole Stoneley and dipole flexural dispersion plots of the Hard shale G32 core sample and FIG. 2B illustrates the synthetic Pseudo-Rayleigh dispersion plot of the Hard shale G32 core sample.

To study the sensitivity, the following expressions are used, in embodiments, to calculate the sensitivities to mud slowness, Thomsen γ, ε, δ, respectively:

$$\text{Sensitivity}_{dtm}^{mode} = \frac{(S_0 - S(\Delta dtm))/S_0}{\Delta dtm/dtm},$$

$$\text{Sensitivity}_{\epsilon}^{mode} = \frac{S_0 - S(\Delta \epsilon)}{S_0 \Delta \epsilon},$$

$$\text{Sensitivity}_{\gamma}^{mode} = \frac{S_0 - S(\Delta \gamma)}{S_0 \Delta \gamma},$$

$$\text{Sensitivity}_{\delta}^{mode} = \frac{S_0 - S(\Delta \delta)}{S_0 \Delta \delta},$$

where superscript 'mode' can represent different borehole modes, such as Stoneley, dipole flexural, Pseudo-Rayleigh, or quadrupole, etc., dtm, ε, γ, δ denote mud slowness and Thomsen parameters (ε, γ, δ), respectively. $S_0$ denotes the dispersion curves in the reference state, and S(Δdtm), S(Δε), S(Δγ) and S(Δδ) denote the dispersion curves due to a small perturbation of dtm, ε, γ, δ, respectively.

Figure 3A:
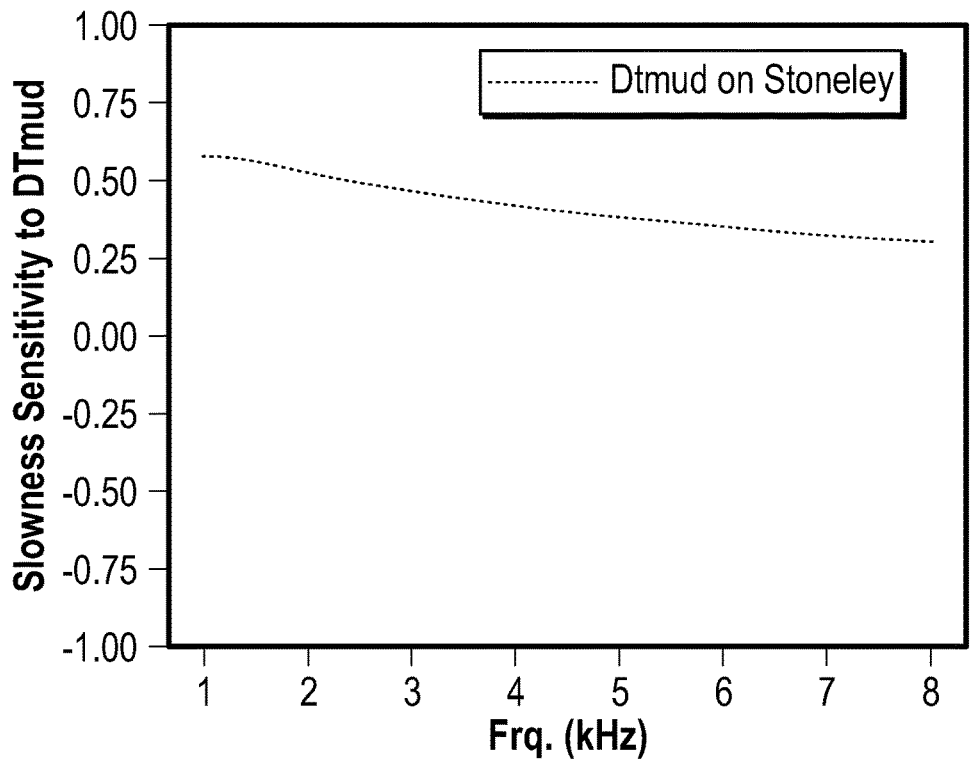
FIG. 3A is a sensitivity plot over frequency of monopole Stoneley to mud slowness for a North Sea shale A1 core sample.
Figure 3B:
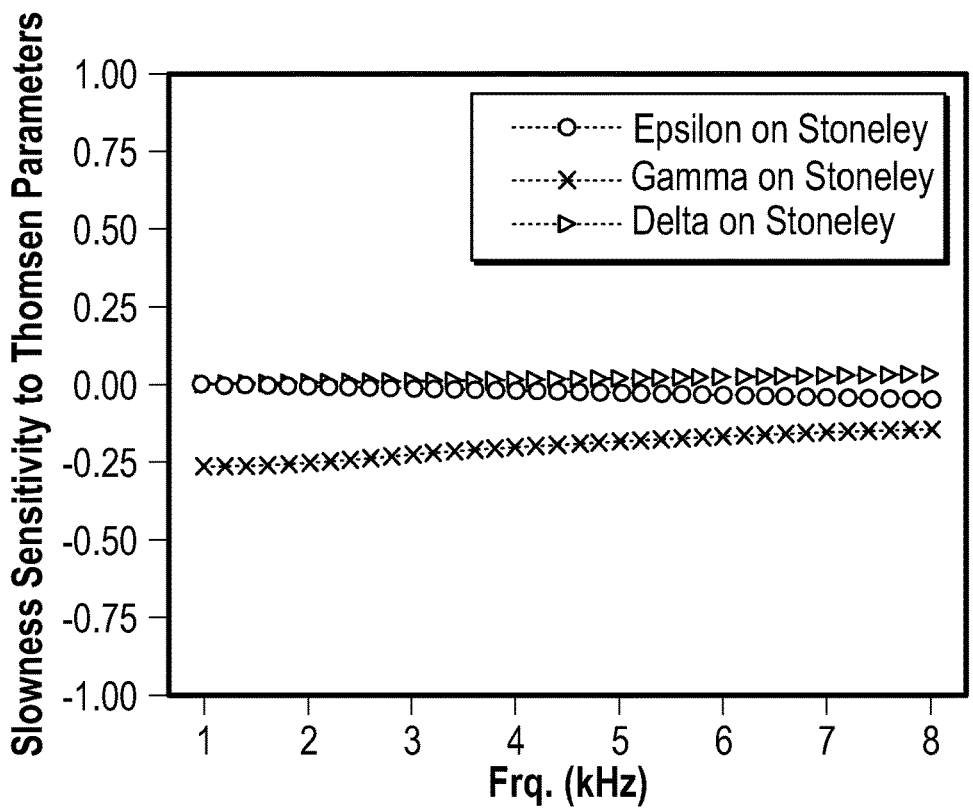
FIG. 3B is a sensitivity plot over frequency of monopole Stoneley to Thomsen parameters of $\epsilon$, $\gamma$, and $\delta$ for the core sample of FIG. 3A.
Figure 4A:
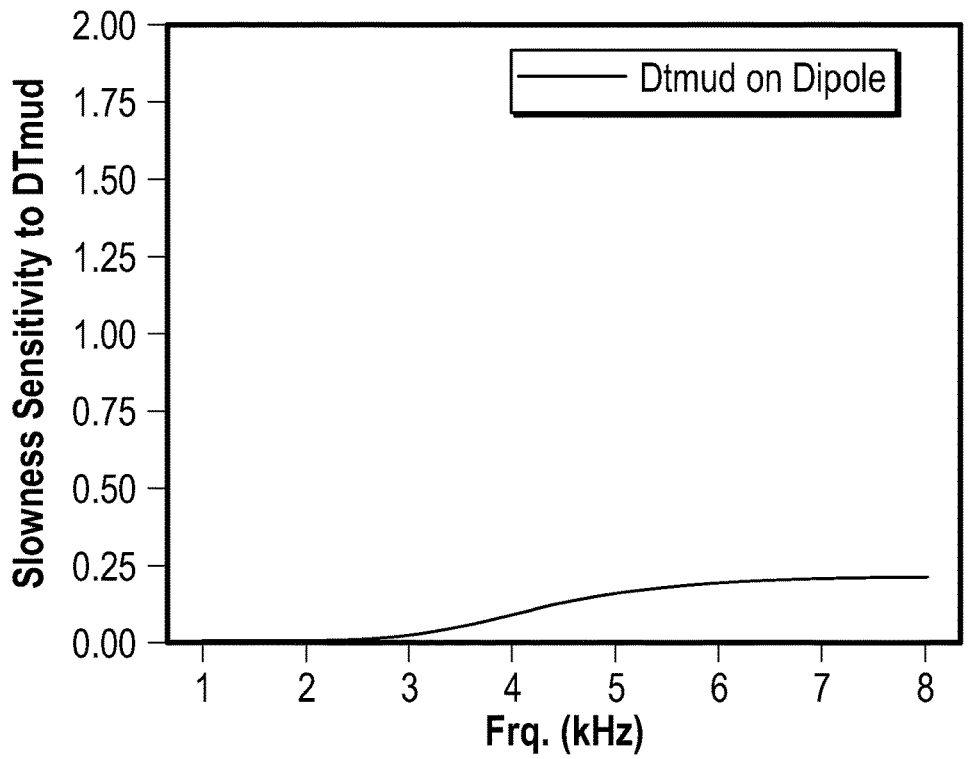
FIG. 4A is a sensitivity plot over frequency dipole flexural dispersion to mud slowness of a North Sea shale A1 core sample.
Figure 4B:
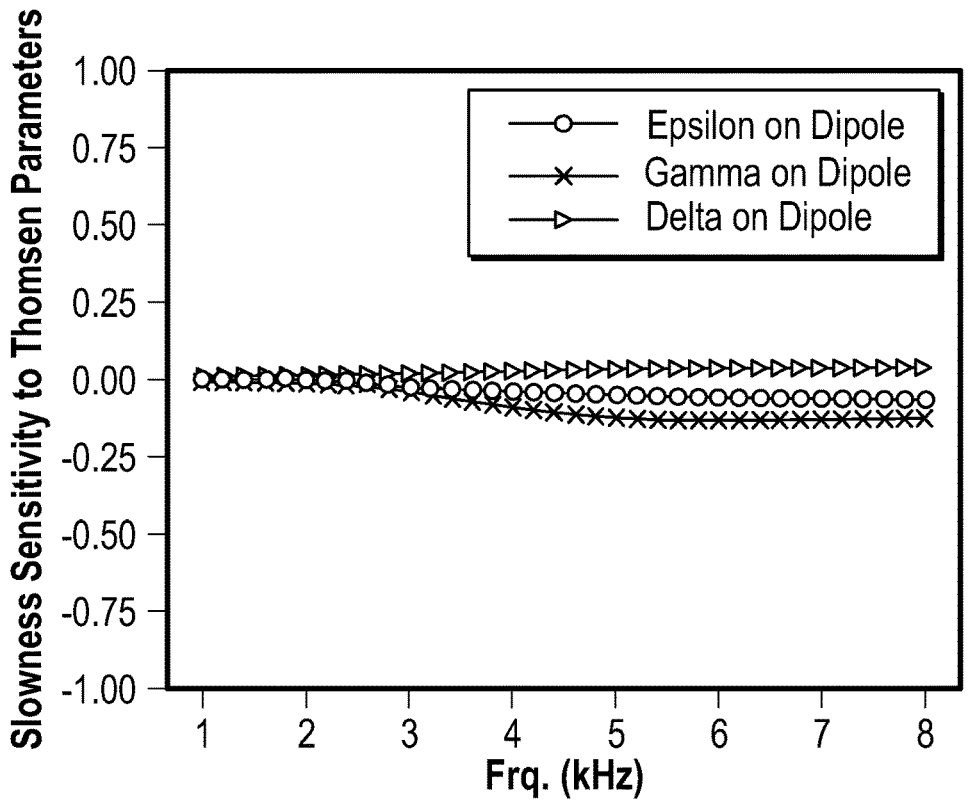
FIG. 4B are sensitivity plots over frequency of dipole flexural dispersion to Thomsen parameters $\epsilon$, $\gamma$, and $\delta$ for the core sample of FIG. 4A.
Figure 5A:
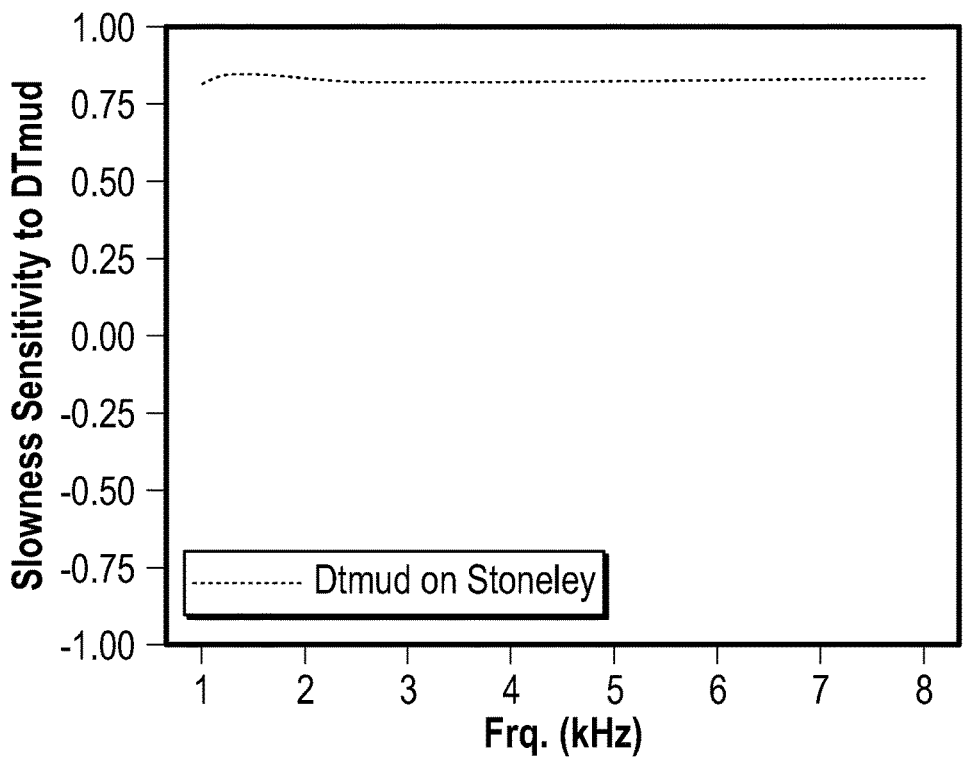
FIG. 5A is a sensitivity plot over frequency of monopole Stoneley to mud slowness for a hard shale G32 core sample.
Figure 5B:
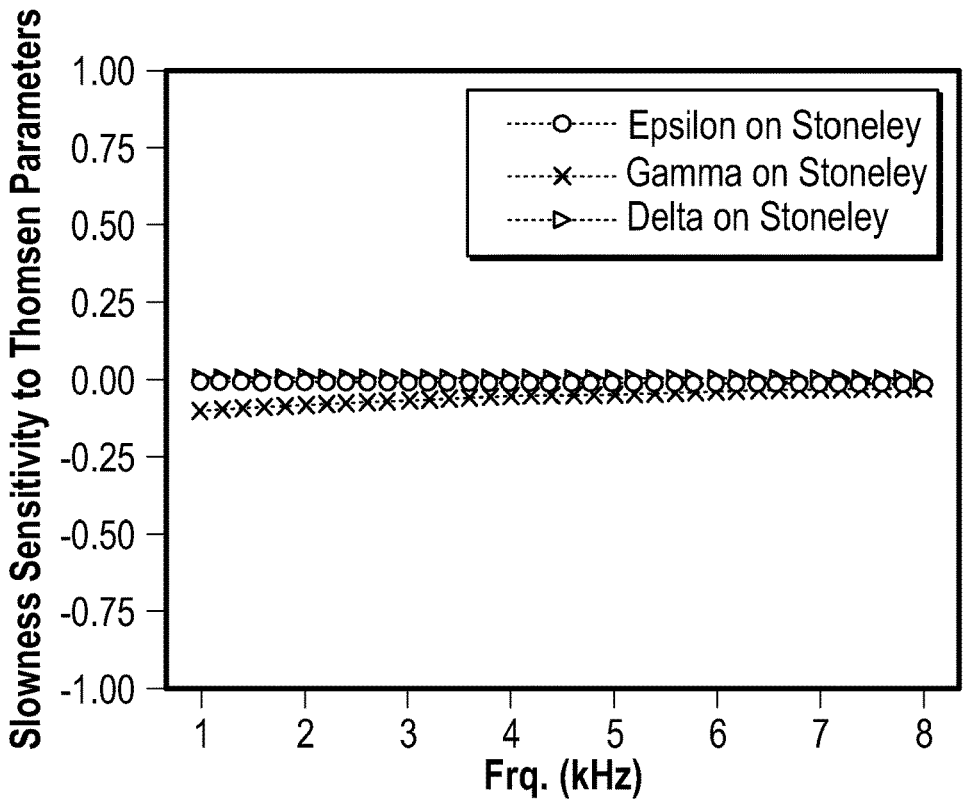
FIG. 5B are sensitivity plots over frequency of monopole Stoneley to Thomsen parameters of $\epsilon$, $\gamma$, and $\delta$ for the core sample of FIG. 5A.
Figure 6A:
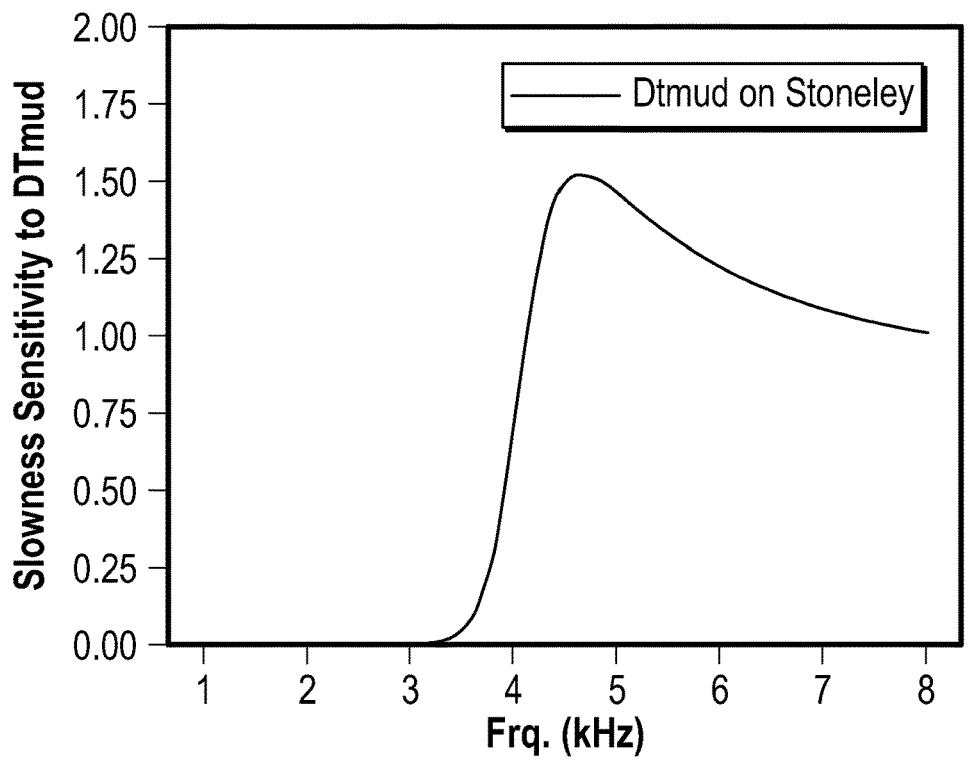
FIG. 6A is a sensitivity plot over frequency of dipole flexural and mud slowness for a hard shale G32 core sample.
Figure 6B:
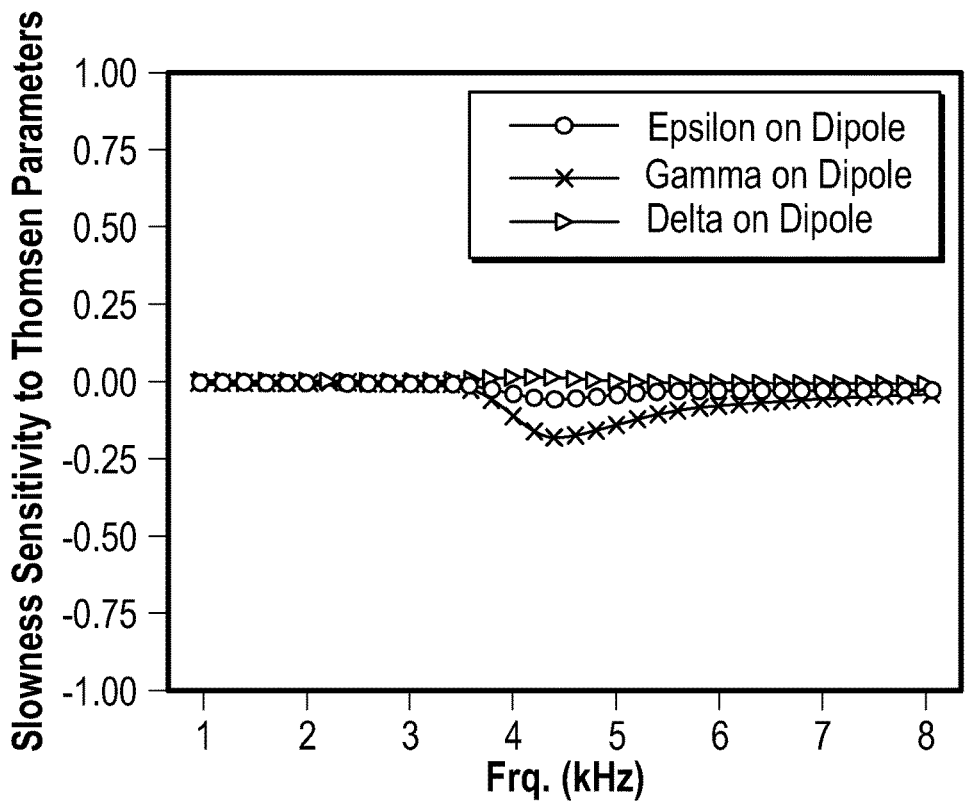
FIG. 6B are sensitivity plots over frequency of dipole flexural of Thomsen parameters of $\epsilon$, $\gamma$, and $\delta$ for the core sample of FIG. 6A.
Figure 7A:
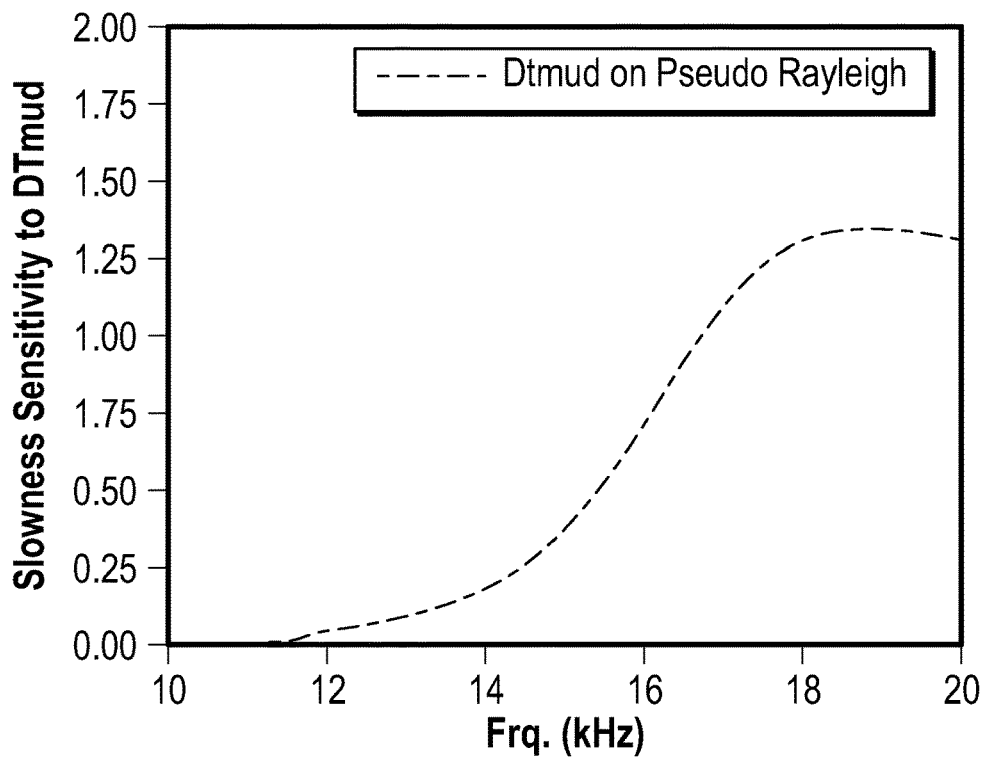
FIG. 7A is a sensitivity plot over frequency of Pseudo-Rayleigh to mud slowness of a hard shale G32 core sample.
Figure 7B:
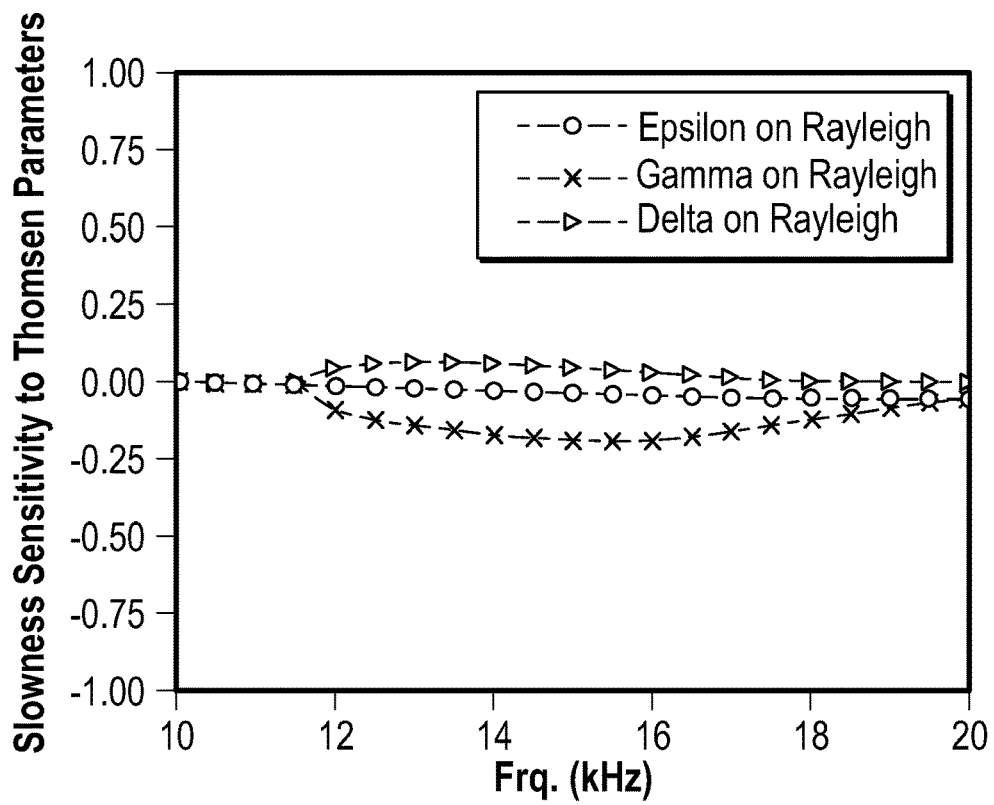
FIG. 7B illustrate sensitivity plots over frequency of Pseudo-Rayleigh to Thomsen parameters of $\epsilon$, $\gamma$, and $\delta$ for the core sample of FIG. 7A.

FIG. 3 and FIG. 4 plot the sensitivity analysis of the Stoneley and dipole dispersions to different input parameters, respectively, of the North Sea shale A1 core data. FIG. 5, FIG. 6 and FIG. 7 plot the sensitivity analysis of the Stoneley, dipole and Pseudo-Rayleigh dispersions to different input parameters, respectively, of the Hard shale G32 core sample.

Note that the sensitivity is a non-linear function of the perturbation in dtm, ε, γ, δ. In the sensitivity analysis, we give small perturbation of these parameters. For example, in FIG. 3A, FIG. 4A, FIG. 5A, FIG. 6A and FIG. 7A the slowness sensitivity to mud slowness is calculated by perturbation of mud slowness of 5%. On the other hand, in FIG. 3B, FIG. 4B, FIG. 5B, FIG. 6B and FIG. 7B, the slowness sensitivity to the Thomsen parameters is calculated by perturbation of the Thomsen parameters of 5%.

From these sensitivity analyses, it can be observed that all these four unknowns (i.e., mud slowness, ε, γ, and δ) may have very different influences on the dispersion curves on a case-by-case basis. Consequently, the values cannot be ignored in the inversion workflow. In an embodiment, as a general scenario, all 4 parameters are inverted (for the VTI case) and the uncertainties quantified. Additionally, as the sensitivity behavior between different modes can be very different, all the available borehole modes are used in the inversion to improve inversion stability.

Correlation Among VTI Parameters

Figure 8A:
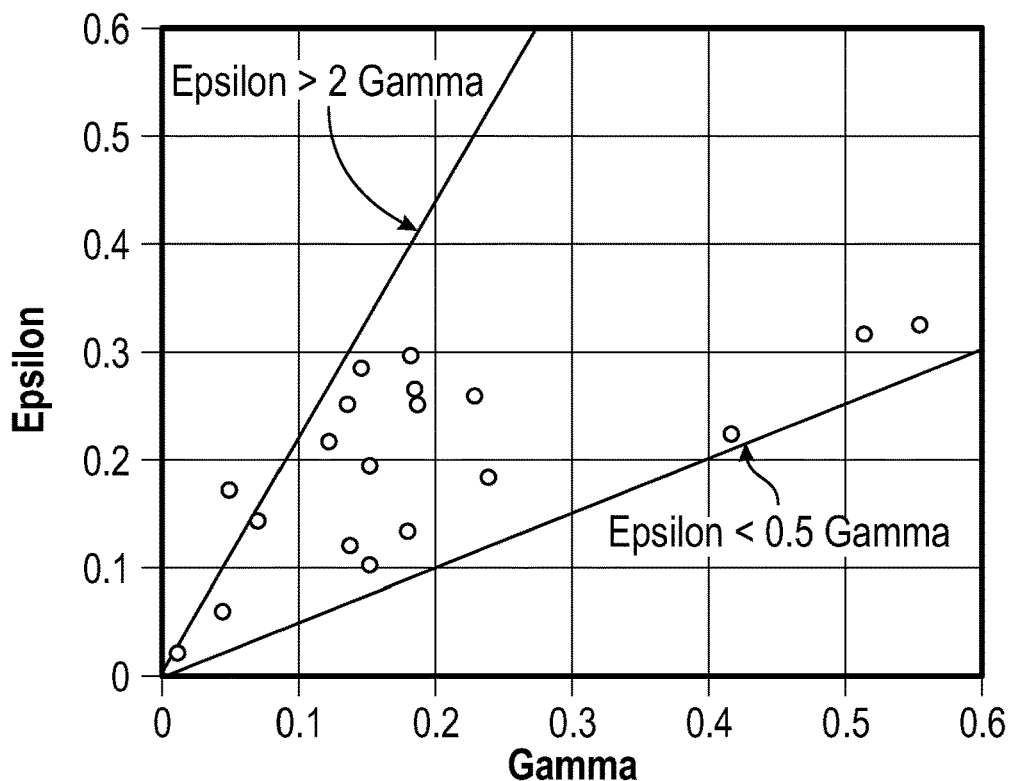
FIG. 8A is a correlation plot for $\gamma$ and $\epsilon$ using data from Table 1.
Figure 8B:
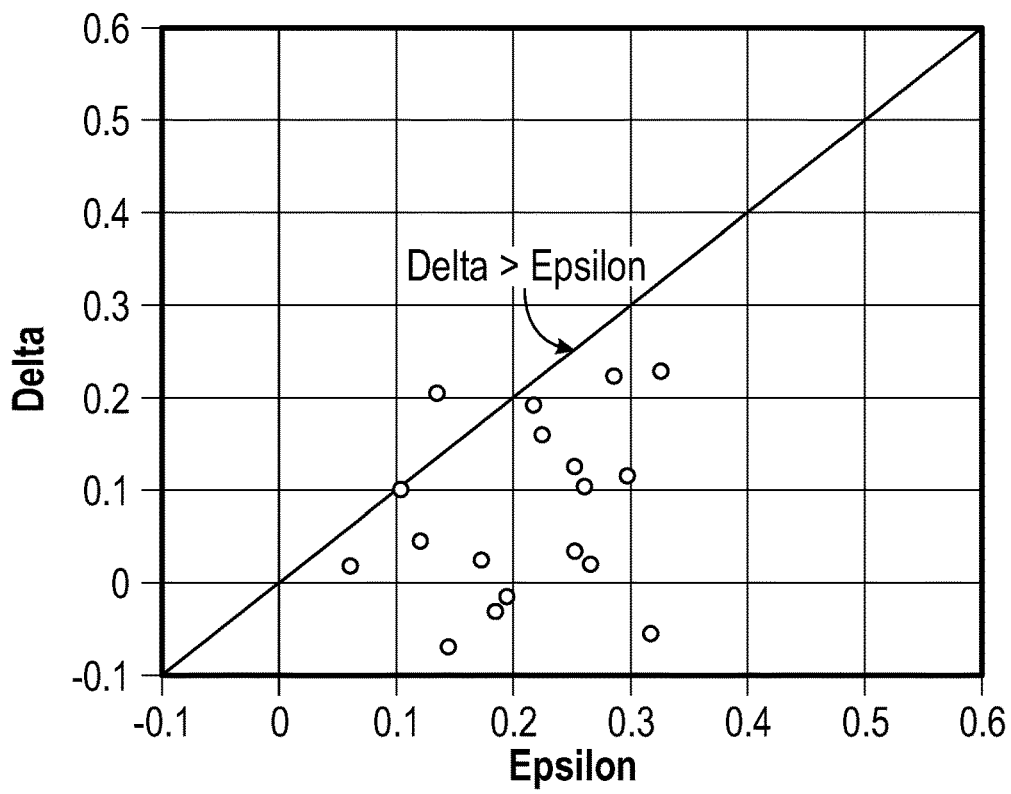
FIG. 8B is a correlation plot for $\epsilon$ and $\delta$, using data from Table 1.
Figure 9:
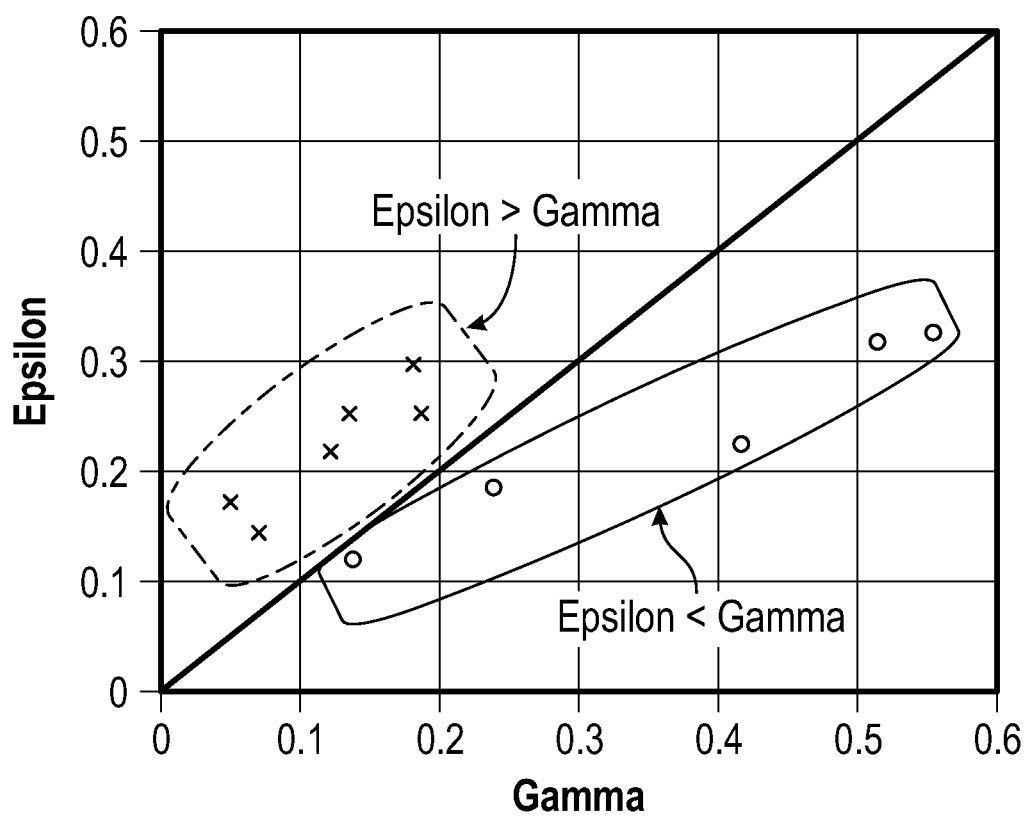
FIG. 9 is a local correlation from core data reported in Table 1 wherein symbols with 'X' and 'O' are representative of two different local lithologies.

As mentioned in the previous section, all anisotropic parameters and mud slowness (i.e., dtm, γ, ε, δ) are required to be treated as unknowns in the inversion. However, such an inversion can be very ill-conditioned even when we use all available dispersion modes from monopole and dipole and quadrupole transmitters. To overcome this challenge, we used physical or empirical correlations among the Thomsen parameters and other known parameters to constrain and stabilize our inversion. For example, FIG. 8A plots the correlations between ε and γ using all core data from Table 1, and FIG. 8B plots the correlations between ε and δ. We can see empirical bounds of 0.5 γ<ε<2γ from FIG. 8A and an empirical bound of δ<ε from FIG. 8. These bounds can be used to stabilize the inversion. In addition, such bounds can be updated during the inversion process. For example, FIG. 9 plots some of the core data listed in Table 1, we can see these data can be clustered into 2 sets, one set with ε>γ, and another set with ε<γ. Such a new relationship can be obtained during the inversion 'on-the-fly' using a data-driven approach, which will be discussed in the next section.

Method to Invert for the Thomsen Parameters and Mud Slowness Using Stoneley, Dipole and/or Pseudo-Rayleigh Dispersions The inversion method is formulated in this section for a VTI formation, and where the theoretical dispersions can be written as:

$$D_{theory}^{mode}(f) = F_{tool}^{mode}(\alpha, \rho_b, \rho_m, \text{dtc}, \text{dts}, \text{dtm}, \epsilon, \gamma, \delta, \text{well\_devi}, \text{tool\_azim}), \quad (1)$$

where the 11 input parameters α, $\rho_b$, $\rho_m$, dtc, dts, dtm, ε, γ, δ, well_devi, tool_azim denote borehole radius, formation density, mud density, formation compressional and shear vertical slowness, mud slowness, Thomsen parameters (ε, γ, δ), well deviation and tool azimuthal direction in the well, respectively. The superscript 'mode' represents different modes, such as Stoneley (ST), dipole flexural (FL), Pseudo-Rayleigh (PR) or Quadupole (QD).

If multiple-mode acquisition is available in the tool, theoretical dispersions can be combined as:

$$D_{theory} = [D_{theory}^{ST}, D_{theory}^{FL}, D_{theory}^{PR}, D_{theory}^{QD}]. \quad (2)$$

The inversion process can be done by matching the theoretical dispersions with the measured dispersions. The matching processing is done by sampling either uniformly or randomly the unknown parameters within a given range. Based on the above discussion on physical or empirical correlations, we can define the range of ϵ and δ as $$k_{min}\gamma < \epsilon < k_{max}\gamma \quad (3),$$

$$l_{min}\epsilon < \delta < l_{max}\epsilon. \quad (4)$$

These two conditions help us to reduce the searching range in the matching process and consequently improve the performance and stability. Finally, the mismatch between the measured dispersions and the theoretical dispersions can be calculated by:

$$E = |D_{theory} - D_{measured}| \quad (5)$$

Figure 10:
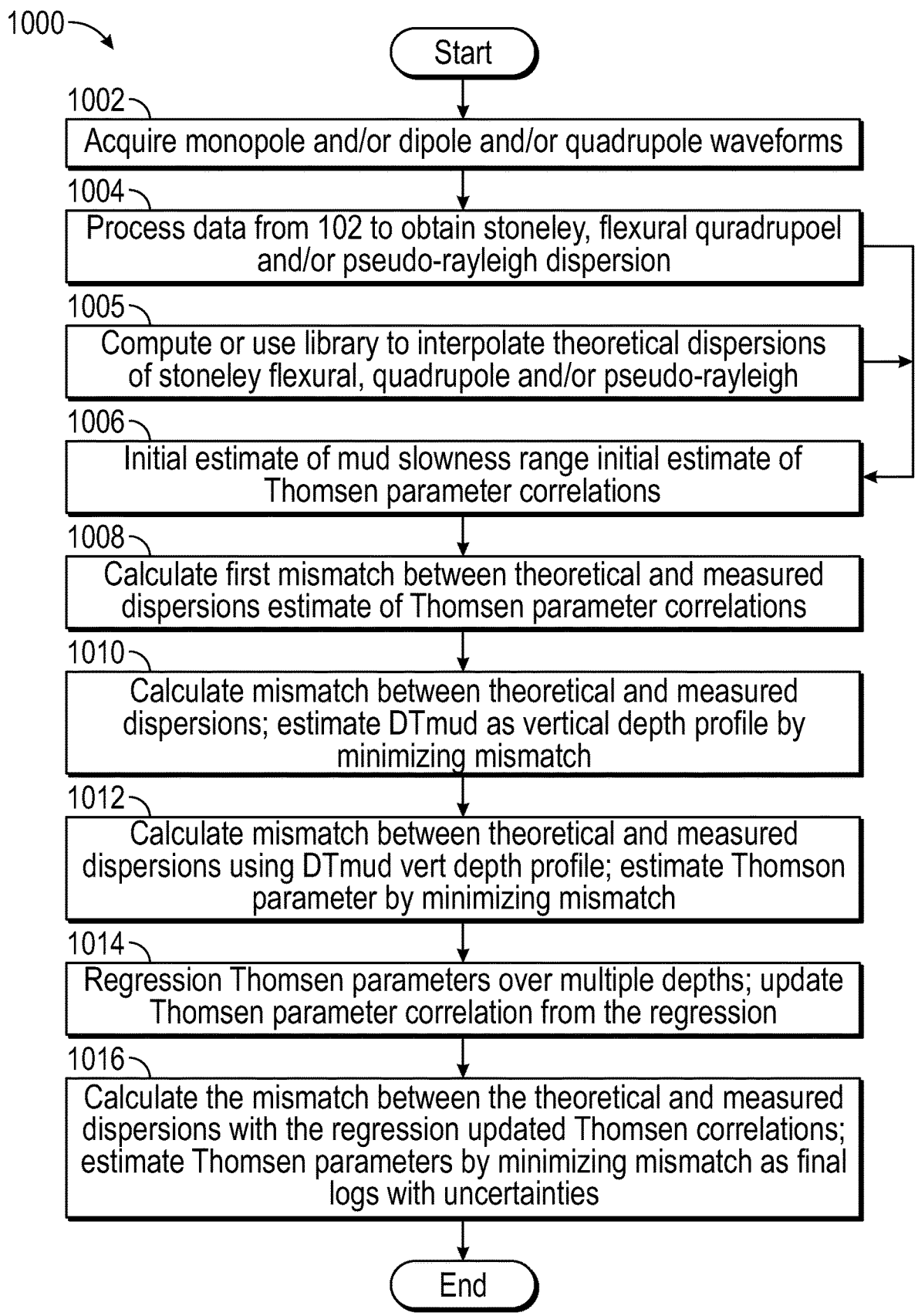
FIG. 10 is a method illustrating a data-driven inversion process in one non-limiting example embodiment of the disclosure.

The inversion workflow consists of several steps (FIG. 10). For example, in the first step, the inversion is run by minimizing Equation 5, where the minimization can be achieved by random search or by grid search within the initial guess of dtm, as well as initial range of ϵ, γ, and δ that are constrained by Equations 3 and 4.

Next, based on the fact that dtm changes gradually over 2 consecutive logging depths (for example, 0.5 ft. that is typically used in the industry), after the first step, linear regression, non-linear regression or an eyeballing method may be used to optimize a mud slowness as a linear profile, multi-linear profile, or non-linear profile over logging depth. The mud slowness depth profiles can be associated with uncertainties that are obtained from the regression method.

Then, the inversion may be run again as the second step, where the range of dtm is reduced by using the regressed profile from the first step, with or without uncertainties. As dtm now has a much narrower range or is a single value, the inverted Thomsen parameters can be more stable than the first step. Consequently, the linear regression, non-linear regression or an eyeballing method is applied to optimize the range among ϵ, γ, and δ in the format of Equations 3 and 4. The regressions can give a new reduced range of $k_{min}$, $k_{max}$, $l_{min}$, and $l_{max}$.

Finally, as the third step, the inversion is run again using the newly regressed range of $k_{min}$, $k_{max}$, $l_{min}$, and $l_{max}$ to get final results of the Thomsen parameters, with or without uncertainties.

It is important to note that physical or empirical constrained conditions like Eq.3 and 4 can be straightforwardly extended to incorporate more correlations with other known (e.g., other petrophysical inputs) or unknown parameters based on data availability. Additionally, theoretical and measured data can be extended to add other modes like casing dispersion, and tool flexural modes in either logging-while-drilling or cased-hole logging scenario.

ILLUSTRATIVE EXAMPLES

Synthetic Case Test #1

Figure 11:
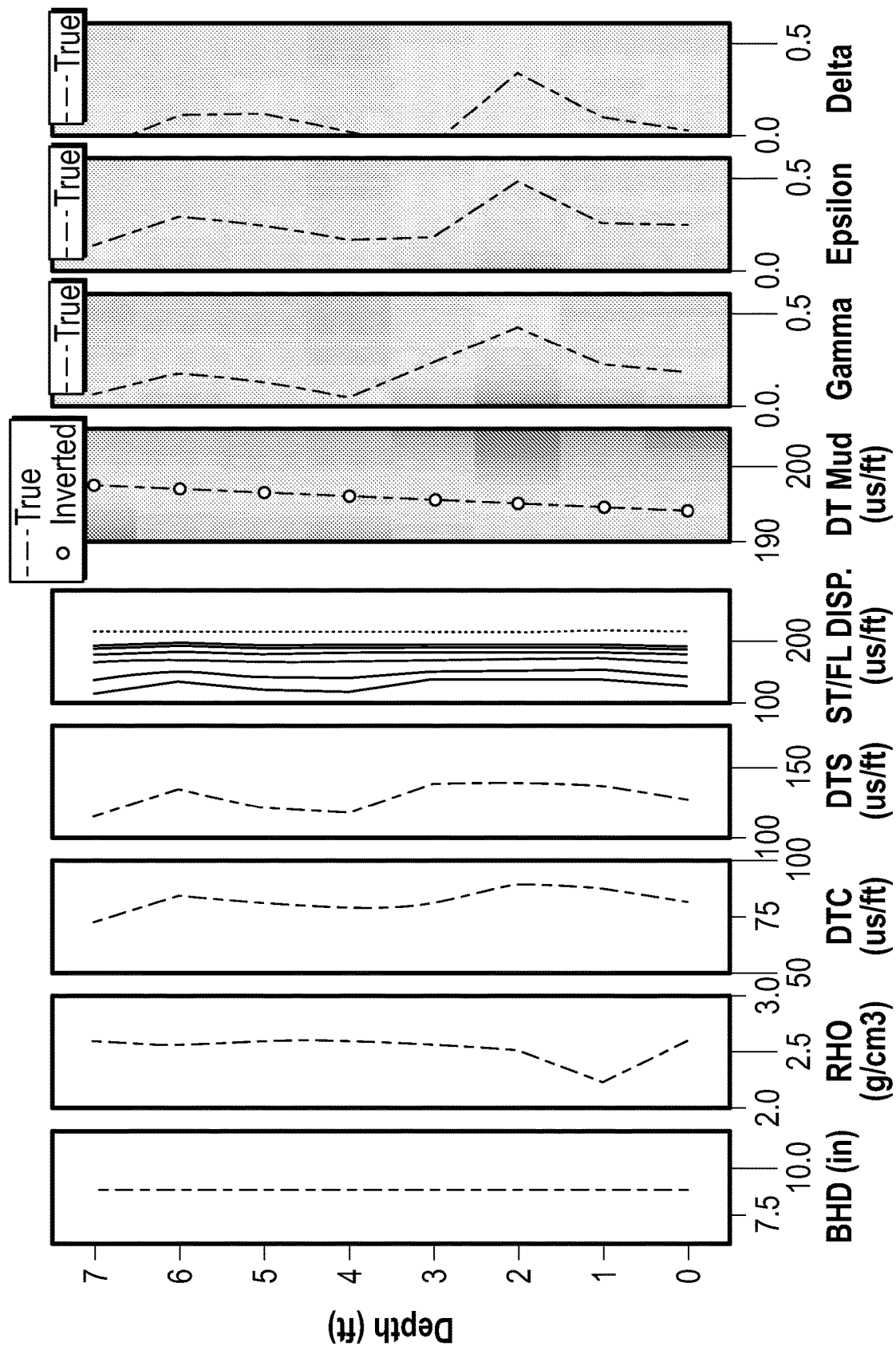
FIG. 11 is a depiction of a synthetic test using 8 synthetic core data and assuming a linear mud slowness profile. From left to right: borehole diameter (track 1), formation density (track 2), compressional slowness (track 3), shear slowness (track 4), dipole flexural and Stoneley dispersions at frequencies from: 1 to 8 kHz (track 5), mismatch map for different values for dtmud (track 6), mismatch map for different values for $\gamma$ (track 7); mismatch map for different values of $\epsilon$ (track 8); mismatch map for different values of $\delta$ (track 9). The inverted mud slowness shown in dots and true mud slowness shown in solid line are overlaid in track 5.
Figure 12:
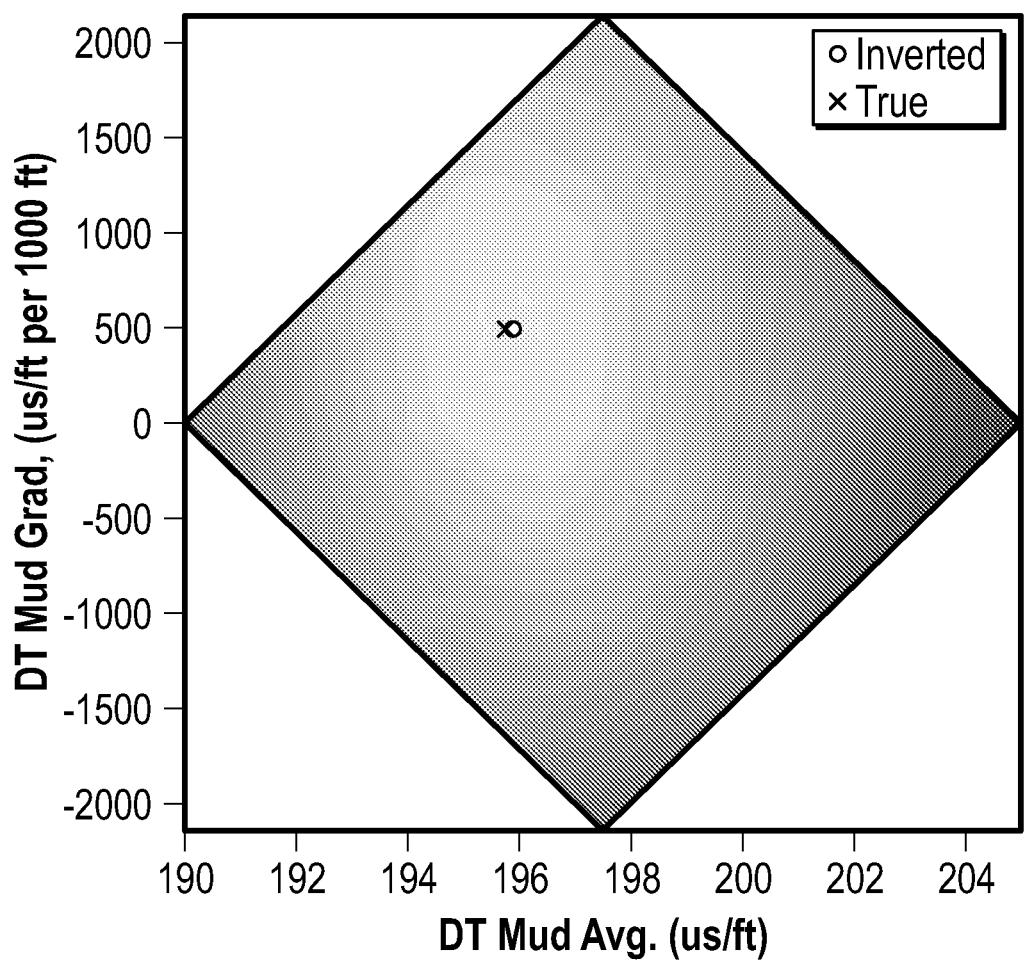
FIG. 12 is a depiction of a synthetic test having an inverted mud slowness average value and depth gradient using 8 synthetic core data and assuming a linear mud slowness profile. The inverted value is shown in 'o' whereas the true value is shown in 'x'.

FIG. 11 to FIG. 14 demonstrate synthetic examples of this data-driven physically constrained inversion method. In FIG. 11, 8 core sample data are used to generate synthetic Stoneley and flexural dispersions (track 5). In generating these synthetic dispersions, as an illustrative example, a linear mud slowness profile is assumed, whereas in reality the mud slowness may also be assumed to be non-linear. Track 1 to 4 plots the borehole diameter, formation density, compressional and shear slowness, respectively. The calculated mismatch is projected into mud slowness axis and is plotted in track 6. From the mismatch value, a linear mud slowness may be regressed using 2 parameters of a linear curve: the mud slowness value in the middle depth of the logging interval and mud slowness depth gradient, as shown in FIG. 12. It can be seen that the regressed mud slowness profile matches very well with the true profile. However, we can also see the minimization of the Thomsen parameters is not well defined in this step. As described previously, a second step inversion using the regressed mud slowness is therefore necessary.

Synthetic Case Test #2

Figures 13A, 13B, 13C:
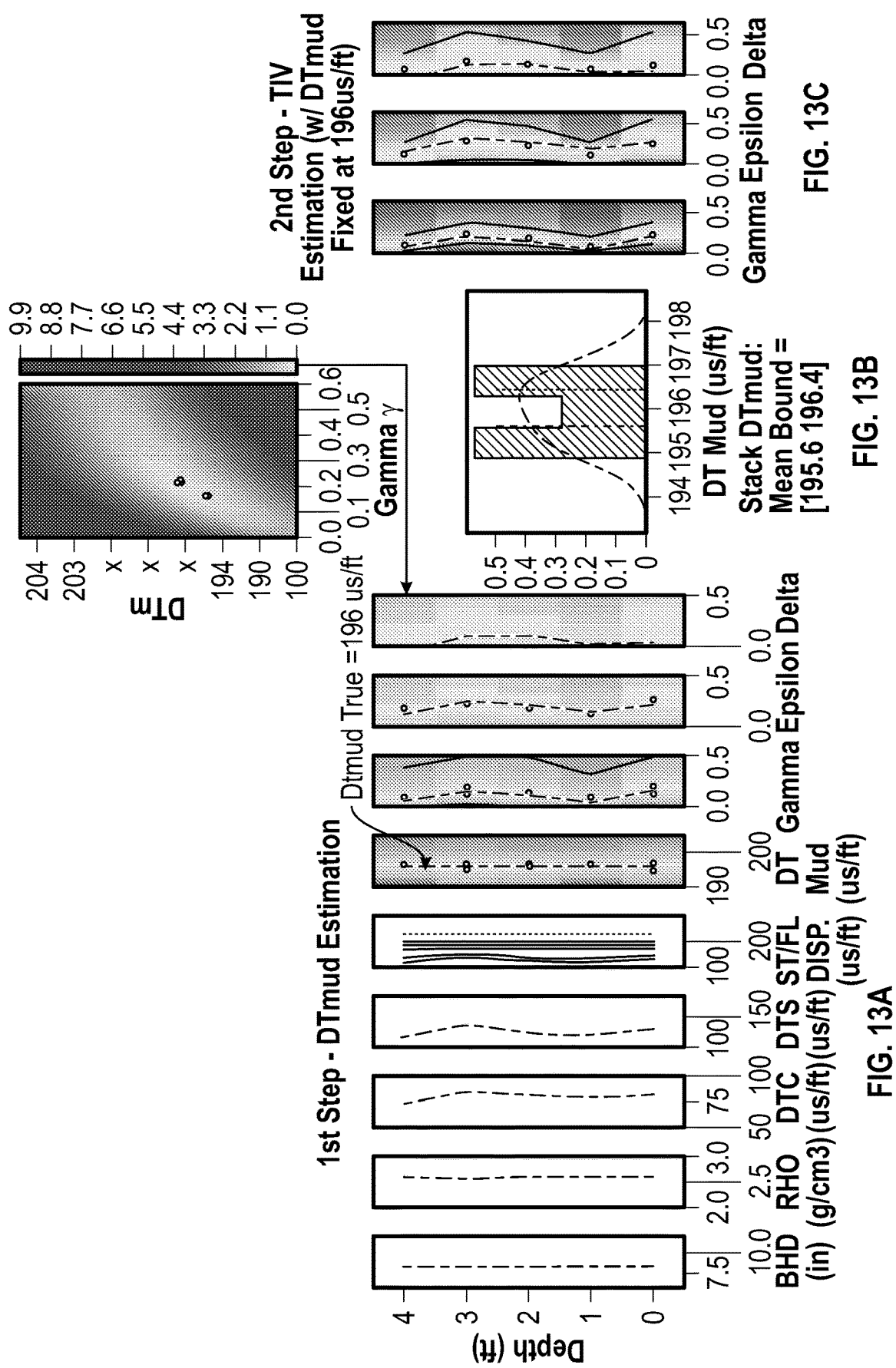
FIGS. 13A through 13C are a depiction of a second synthetic test wherein in FIG. 13A (a) inversion result using 5 synthetic core data and assuming a constant mud slowness profile. From left to right: borehole diameter (track 1), formation density (track 2), compressional slowness (track 3), shear slowness (track 4), dipole flexural and Stoneley dispersions at frequencies from 1 to 8 kHz (track 5), mismatch map for different values for dtmud (track 6), mismatch map for different values for $\gamma$ (track 7); mismatch map for different values of $\epsilon$ (track 8); mismatch map for different values of $\delta$ (track 9); The red dots from track 6 to 8 represent peaks in the mismatch map. In some depths, we can observe multiple peaks, which represent multiple local minimums in the constructed mismatch map.

FIG. 13 illustrates a case of how the regressed mud slowness can help to improve the stability of VTI parameters. In this case, five core samples are selected as inputs. These five core samples are taken from the same field so that the correlation between Thomsen parameters can represent a local range. For this case, a constant profile of mud slowness is assumed. The first step inversion is shown in FIG. 13A, where it can be seen, although there may be a mismatch map for the three Thomsen parameters from track 7 to track 9, their minimum values are with large uncertainties.

In FIG. 13B, mud slowness values are stacked to get an averaged value over the 5 depths and apply this averaged value to a second step inversion, as shown in FIG. 13C. Note that the dashed lines in the tracks represent the uncertainties, which are computed by finding mismatch values less than 1 us/ft. With mud slowness stacked at 196 us/ft, estimation of the Thomsen parameters in step 2 now has much less uncertainties compared to step 1.

Figures 14A, 14B, 14C, 14D:
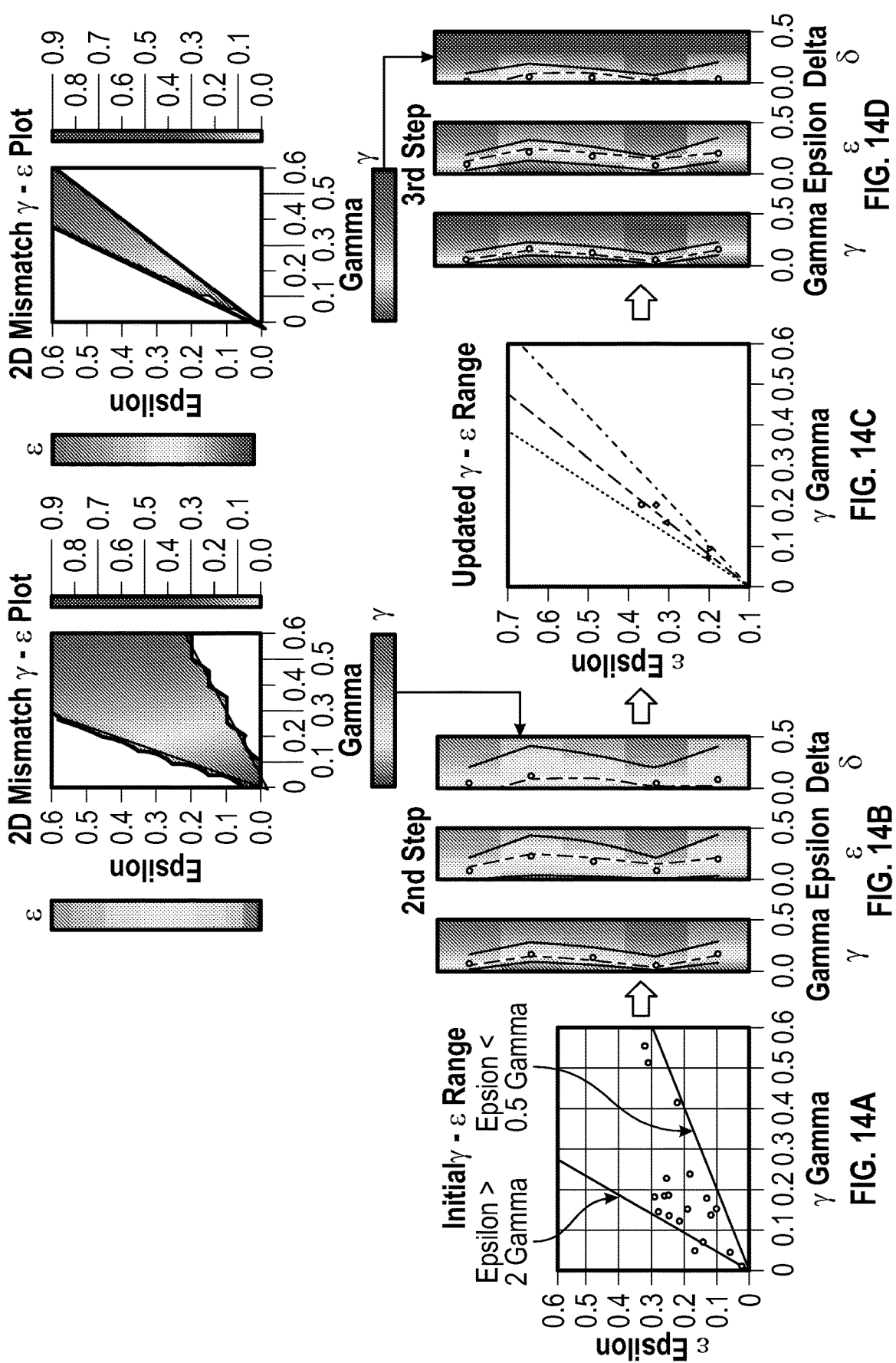
FIGS. 14A through 14D show results of a second sythetic test.

FIG. 14 illustrates a case on how the updated correlation among the Thomsen parameters can help to further stabilize the inversion. FIG. 14A shows the initial correlation between ϵ and γ. The second step inversion is shown in tracks 1 to 3 of FIG. 14B, where the dots are the mismatch peaks. In FIG. 14C, the peaks are overlaid over the 5 depths and then plotted as a cross-plot. In this synthetic test core samples are used from the same field, so that a new reduced correlation between ϵ and γ can be regressed. For example, this localized relationship is obtained by a linear regression method, which gives 1.0 γ<ϵ<1.6 γ, as shown in the dashed line of FIG. 14C. Finally, in the third step inversion shown in tracks 1 to 3 of FIG. 14D the new correlation of 1.0 γ<ϵ<1.6 γ is applied that is obtained from FIG. 14C. With γ and ϵ correlation range reduced, estimation of the Thomsen parameters in step 3 now has much less uncertainties compared to step 2. Note that the dashed lines represent the uncertainties, which are computed by finding mismatch values less than 1 us/ft.

At 1002 a monopole and/or dipole and/or quadrupole waveform is acquired. At 1004, the monopole and/or dipole and/or quadrupole waveform is processed to obtain Stoneley, flexural, quadrupole and/or pseudo-Rayleigh dispersion. Different methods such as TKO, SPI and SDICE may be used in 1004. TKO is described in Ekstrom, M. E., "Dispersion Estimation from Borehole Acoustic Arrays Using a Modified Matrix Pencil Algorithm," 29th Asilomar Conf. Signals Systems and Computing, Pacific Grove, Calif., Oct. 31, 1995. At 1005, a computation may be performed or a library may be used to interpolate theoretical dispersions of Stoneley, flexural, quadrupole and/or Pseudo-Rayleigh. At 1006, using data from 1004 and 1005, the method continues of performing an initial estimate of mud slowness range and an initial estimate of Thomsen parameter correlations. At 1008, the method proceeds with calculating a mismatch between theoretical and measured dispersions. In 1008, the value DTmud may be estimated as a vertical depth profile by minimizing the mismatch between the theoretical and measured dispersions. At 1010, a second calculation of a mismatch between the theoretical and measured dispersions using the DTmud vertical depth profile is performed. In 1010, Thomsen parameters may be estimated by minimizing the mismatch calculated in step 1010. At 1012, using regression, Thomsen parameters are calculated over multiple depths. The Thomsen parameter values may be updated from the regression. At 1014, a mismatch between the theoretical and measured dispersions is calculated with the regression updated parameters obtained in 1012. At 1014, the Thomsen parameters may be estimated by minimizing the mismatch as final logs with uncertainties.

Example embodiments will now be disclosed. These example embodiments should not be considered limiting. In one non-limiting embodiment, a method is disclosed. The method may comprise obtaining a waveform and processing the obtained waveform to obtain at least one of a Stoneley, flexural, quadrupole and Pseudo-Rayleigh dispersion. The method may also comprise at least one of performing a computation and obtaining a library computation for interpolated theoretical dispersions of the Stoneley, flexural, quadrupole and Pseudo-Rayleigh dispersions. The method may also comprise performing an initial estimate of mud slowness using both the processing of the obtained waveform and the interpolating the theoretical dispersions and calculating a mismatch between the processed waveform obtaining the at least one Stoneley, flexural, quadrupole and Pseudo-Rayleigh dispersion and the theoretical dispersions of the Stoneley, flexural, quadrupole and Pseudo-Rayleigh dispersions. The method may further comprise estimating at least one DTmud value as a vertical depth profile and calculating a second mismatch between the theoretical dispersion and the processed waveform using the at least one estimated DTmud value. The method may also comprise estimating at least one parameter by minimizing the second mismatch and using regression, calculating the at least one parameter over multiple depths. The method may also comprise updating values for the at least one parameter based upon the regression and calculating a third mismatch between the theoretical and measured dispersions based upon the updated values for the at least one parameter based upon the regression. The method may also comprise estimating a final value of the at least one parameter by minimizing a mismatch between the theoretical and measured dispersions.

In another example embodiment, the method may be performed wherein the waveform is generated from a wellbore sonic device.

In another example embodiment, the method may be performed wherein the waveform is at least one of a monopole, a dipole and a quadrupole waveform.

In another example embodiment, the method may be performed wherein the processing of the obtained waveform to obtain the at least one of the Stoneley, flexural quadrupole and pseudo Rayleigh dispersion uses one of a TKO, SPI and SDICE methodology.

In another example embodiment, the method may be performed wherein the DTmud value is estimated by minimizing a mismatch between the theoretical dispersion and the measured dispersion.

In another example embodiment, the method may be performed wherein the at least one parameter estimated by minimizing the second mismatch is a Thomsen parameter.

In another example embodiment, the method may be performed wherein the Thomsen parameter is three Thomsen parameters.

In another example embodiment, the method may be performed wherein the final value is a Thomsen parameter.

In another example embodiment, a method may be performed. The method may comprise obtaining a waveform from a sonic borehole device in a formation. The method may also comprise processing the obtained waveform from the sonic borehole device to obtain at least one value of a Stoneley, flexural, quadrupole and Pseudo-Rayleigh dispersion. The method may also further comprise performing a computation to produce a theoretical dispersion of the Stoneley, flexural, quadrupole and Pseudo-Rayleigh dispersions for the waveform. The method may further comprise performing an initial estimate of mud slowness using both the processing of the obtained waveform and the theoretical dispersion. The method may also comprise calculating a first mismatch between the processed waveform obtaining the at least one Stoneley, flexural, quadrupole and Pseudo-Rayleigh dispersion and the theoretical dispersions of the Stoneley, flexural, quadrupole and Pseudo-Rayleigh dispersions. The method may also comprise estimating at least one DTmud value as a vertical depth profile and calculating a second mismatch between the theoretical dispersion and the processed waveform using the at least one estimated DTmud value. The method may also provide for estimating at least one Thomson parameter for the formation by minimizing the second mismatch and using regression, calculating at least one revised Thomson parameter over multiple depths. The method may also comprise calculating a third mismatch between the theoretical and measured dispersions based upon the updated values for Thomson parameter based upon the regression. The method may further comprise estimating a final value of the at least one Thomson parameter by minimizing a mismatch between the theoretical and measured dispersions.

In another example embodiment, the method may be performed wherein the formation is an anisotropic formation.

In another example embodiment, the method may be performed wherein the waveform is at least one of a monopole, a dipole and a quadrupole waveform.

In another example embodiment, the method may be performed wherein the processing of the obtained waveform to obtain the at least one of the Stoneley, flexural quadrupole and pseudo Rayleigh dispersions uses one of a TKO, SPI and SDICE methodology.

In another example embodiment, the method may be performed wherein the DTmud value is estimated by minimizing a mismatch between the theoretical dispersion and the measured dispersion.

In another example embodiment, the method may be performed wherein the Thomson value is three values.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

What is claimed is:

1. A method, comprising:
obtaining a waveform;
processing the obtained waveform to obtain at least one of a Stoneley, flexural, quadrupole and Pseudo-Rayleigh dispersion;
at least one of performing a computation and obtaining a library computation for interpolated theoretical dispersions of the Stoneley, flexural, quadrupole and Pseudo-Rayleigh dispersions;
performing an initial estimate of mud slowness using both the processing of the obtained waveform and the interpolating the theoretical dispersions;
calculating a mismatch between the processed waveform obtaining the at least one Stoneley, flexural, quadrupole and Pseudo-Rayleigh dispersion and the theoretical dispersions of the Stoneley, flexural, quadrupole and Pseudo-Rayleigh dispersions;
estimating at least one DTmud value as a vertical depth profile;
calculating a second mismatch between the theoretical dispersion and the processed waveform using the at least one estimated DTmud value;
estimating at least one parameter by minimizing the second mismatch;
using regression, calculating the at least one parameter over multiple depths;
updating values for the at least one parameter based upon the regression;
calculating a third mismatch between the theoretical and measured dispersions based upon the updated values for the at least one parameter based upon the regression; and
estimating a final value of the at least one parameter by minimizing a mismatch between the theoretical and measured dispersions.

2. The method according to claim 1, wherein the waveform is generated from a wellbore sonic device.

3. The method according to claim 1, wherein the waveform is at least one of a monopole, a dipole and a quadrupole waveform.

4. The method according to claim 1, wherein the processing of the obtained waveform to obtain the at least one of the Stoneley, flexural quadrupole and pseudo Rayleigh dispersion uses one of a TKO, SPI and SDICE methodology.

5. The method according to claim 1, wherein the DTmud value is estimated by minimizing a mismatch between the theoretical dispersion and the measured dispersion.

6. The method according to claim 1, wherein the at least one parameter estimated by minimizing the second mismatch is a Thomsen parameter.

7. The method according to claim 6, wherein the Thomsen parameter is three Thomsen parameters.

8. The method according to claim 1, wherein the final value is a Thomsen parameter.

9. A method, comprising:
obtaining a waveform from a sonic borehole device in a formation;
processing the obtained waveform from the sonic borehole device to obtain at least one value of a Stoneley, flexural, quadrupole and Pseudo-Rayleigh dispersion;
performing a computation to produce a theoretical dispersion of the Stoneley, flexural, quadrupole and Pseudo-Rayleigh dispersions for the waveform;
performing an initial estimate of mud slowness using both the processing of the obtained waveform and the theoretical dispersion;
calculating a first mismatch between the processed waveform obtaining the at least one Stoneley, flexural, quadrupole and Pseudo-Rayleigh dispersions and the theoretical dispersions of the Stoneley, flexural, quadrupole and Pseudo-Rayleigh dispersions;
estimating at least one DTmud value as a vertical depth profile;
calculating a second mismatch between the theoretical dispersion and the processed waveform using the at least one estimated DTmud value;
estimating at least one Thomson parameter for the formation by minimizing the second mismatch;
using regression, calculating at least one revised Thomson parameter over multiple depths;
calculating a third mismatch between the theoretical and measured dispersions based upon the updated values for Thomson parameter based upon the regression; and
estimating a final value of the at least one Thomson parameter by minimizing a mismatch between the theoretical and measured dispersions.

10. The method according to claim 9, wherein the formation is an anisotropic formation.

11. The method according to claim 9, wherein the waveform is at least one of a monopole, a dipole and a quadrupole waveform.

12. The method according to claim 9, wherein the processing of the obtained waveform to obtain the at least one of the Stoneley, flexural quadrupole and pseudo Rayleigh dispersion uses one of a TKO, SPI and SDICE methodology.

13. The method according to claim 9, wherein the DTmud value is estimated by minimizing a mismatch between the theoretical dispersion and the measured dispersion.

14. The method according to claim 9, wherein the Thomson value is three values.

* * * * *